United States Patent [19]

Wilson et al.

[11] Patent Number: 4,799,155
[45] Date of Patent: Jan. 17, 1989

[54] DATA PROCESSING SYSTEM HAVING A HIERARCHY OF SERVICE COMPUTERS INCLUDING A STATE DISPLAY

[75] Inventors: J. Chris Wilson, Santa Clara; Arun Shah, Cupertino, both of Calif.

[73] Assignee: Amdahl Corporation, Sunnyvale, Calif.

[21] Appl. No.: 948,111

[22] Filed: Dec. 31, 1986

[51] Int. Cl.$^4$ ............................................. G06F 11/00
[52] U.S. Cl. ...................................... 364/200; 371/16
[58] Field of Search ............... 371/9, 11, 16; 364/200, 364/900

[56] References Cited

U.S. PATENT DOCUMENTS

| | | | |
|---|---|---|---|
| 4,244,019 | 1/1981 | Anderson et al. | 364/200 |
| 4,347,564 | 8/1982 | Sugano et al. | 364/132 |
| 4,412,281 | 10/1983 | Works | 364/200 |
| 4,443,849 | 4/1984 | Ohwada | 364/200 |

Primary Examiner—Charles E. Atkinson
Attorney, Agent, or Firm—Fliesler, Dubb, Meyer & Lovejoy

[57] ABSTRACT

A data processing system having a hierarchy of computers including a first computer, a second computer, a third computer, and a fourth computer for displaying data from said third computer. Each of the first and second computers execute independent instruction streams. The first computer includes first circuit locations having redundant connections independently accessible by the second computer under control of the second instruction stream and independent of the first instruction stream. A third computer is provided for executing a third instruction stream. The third instruction stream and the third computer perform support functions which assist and control the operation of the second computer. The second computer includes second circuits having redundant connections independently accessible by the third computer under control of the third instruction stream.

25 Claims, 5 Drawing Sheets

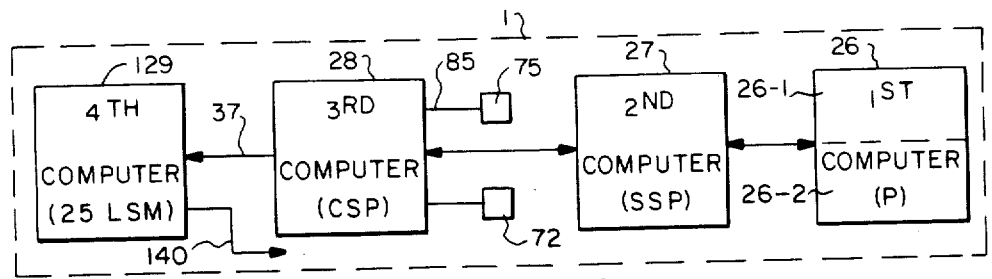
FIG.-1
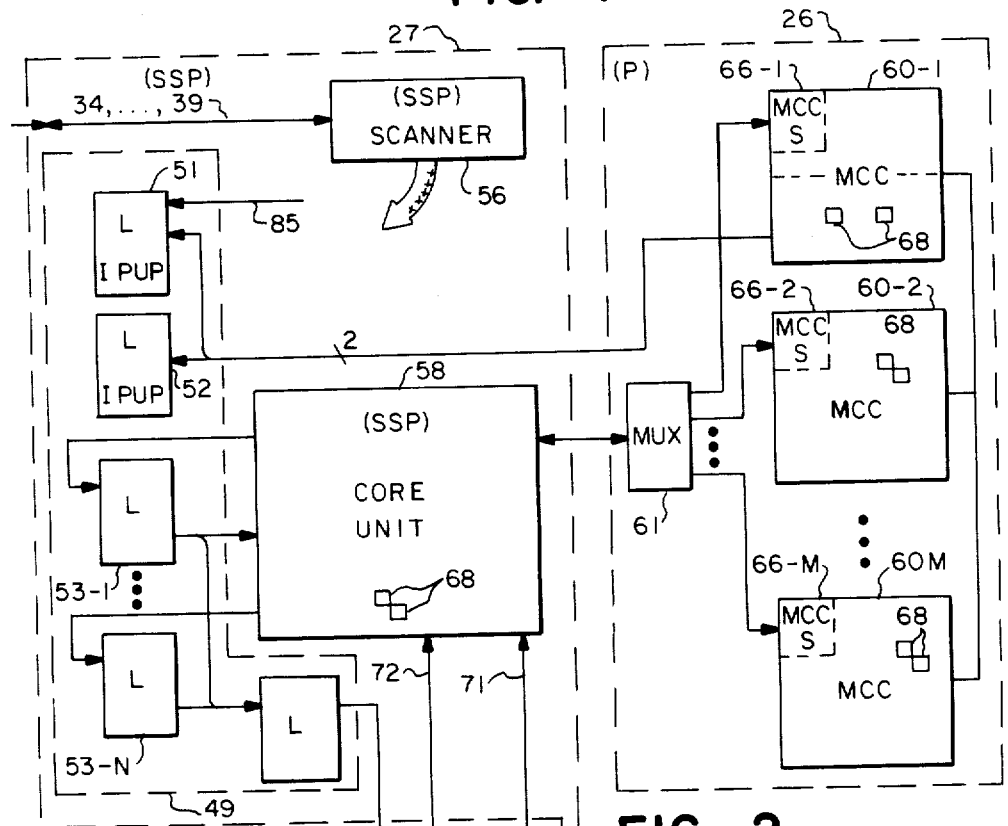
FIG.-2
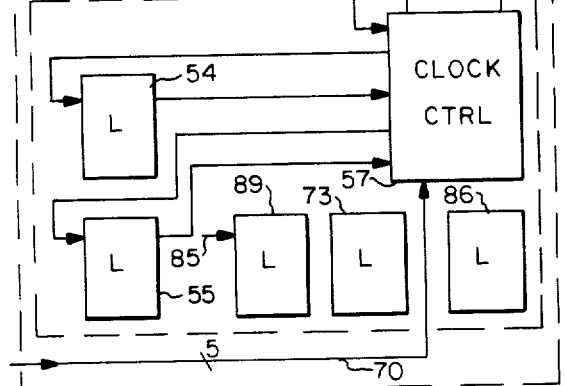
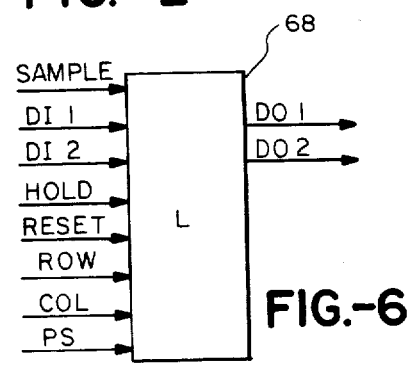
FIG.-6

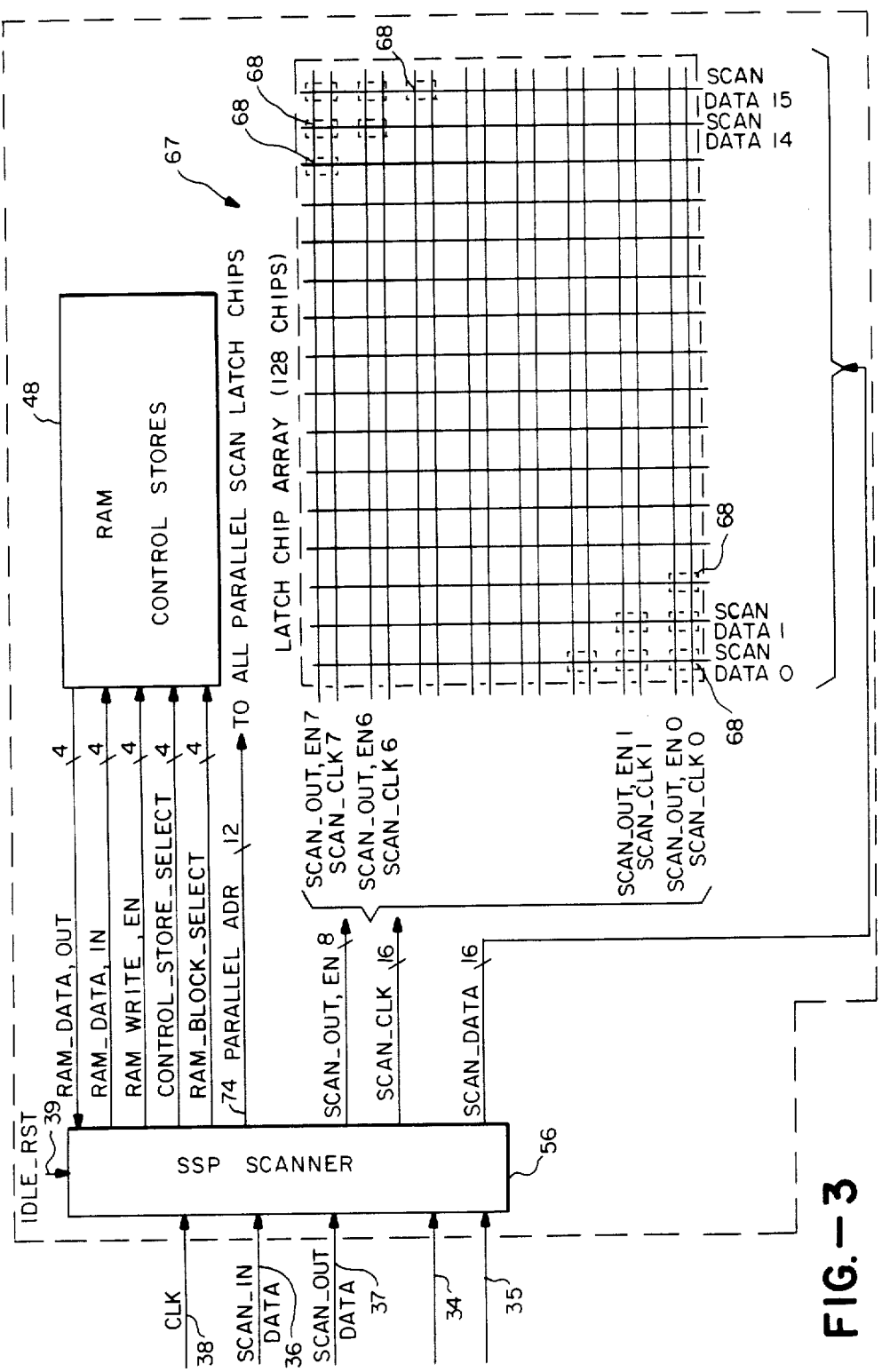
FIG.—3

DATA PROCESSING SYSTEM HAVING A HIERARCHY OF SERVICE COMPUTERS INCLUDING A STATE DISPLAY

CROSS-REFERENCES

DATA PROCESSING SYSTEM HAVING A HIERARCHY OF SERVICE COMPUTERS, Inventors: J. Chris Wilson, Robert Blau; Ser. No.: 06/944,549; Filed: Dec. 19, 1986

A DETERMINISTIC CONTROLLER FOR AN INTERLEAVED ARRAY OF DYMAMIC RAMS, Ser. No.: 06/931,664, Filed: 11/17/86, Inventors: Mark A. Greiner, Ron Kreuzenstein, Ralph J. Mullins, Jeffrey A. Thomas.

SERIAL CHIP SCAN, Ser. No.: 06/880,106, Filed: 06/30/86, now U.S. Pat. No. 4,752,907, issued 6/21/88, Inventor(s): Stephen S. C. Si, J. B. Shackleford, Daryl H. Allred.

MULTIMODE SCAN APPARATUS, Ser. No.: 06/810,526, Filed: 2/16/85, Inventor(s): Stephen S. C. Si, Dale F. Merrick.

ERROR TRACKING APPARATUS IN A DATA PROCESSING SYSTEM, Ser. No.: 06/790,179 Filed: 10/22/85, now abandoned, Inventor(s): Venkatramiah N. M. I. Venkatesh, Robert M. Maier.

BACKGROUND OF THE INVENTION

The present invention relates to the field of digital computers and specifically to a number of computers connected together to form a data processing system.

In data processing systems, control functions are typically implemented using a sequence or stream of instructions called a program where the instructions are sequentially executed to carry out desired data manipulations. In the execution of instructions, the computer utilizes many circuits providing data paths that implement the operation of the computer. These data paths include, for example, registers and memory for storing data, control information, and instructions. As each instruction is executed by the computer, the different circuit locations within the computer assume either logical 1 or logical 0 values as a function of the program execution. The inputs and/or outputs from these locations within the computer are generally referred to as the direct (non-redundant) inputs and/or outputs whenever those inputs or outputs have values which in some way are determined directly as a function of the execution of the program by the computer. The circuit locations within a computer are connected by direct (non-redundant) data paths and control paths which are utilized in support of the execution of the program.

At times it is desirable to have a second or other computers examine or control the logical states of locations within a first computer. One manner of performing such examination or control is to stop the operation of the first computer and allow the second computer to utilize the direct (non-redundant) data and control paths of the first computer. Such operation, however, terminates or slows down execution of the primary programs by the first computer while the second computer executes an alternate instruction stream. If a first computer has an error condition, then frequently that error condition will not only interfere with the execution of the first and primary program by the first computer, but will also interfere with attempt by the second computer to determine the source of the error if the second computer utilizes the same circuit connections and paths as the first computer.

In order to avoid the use of the same circuit connections and paths in a computer, some computers have been provided with redundant input and/or output connections and paths to locations within a computer and have provided redundant accessing means for accessing locations through the redundant input and/or output connections and paths. Such a redundant system is described in U.S. Pat. No. 4,244,019 entitled "DATA PROCESSING SYSTEM INCLUDING A PROGRAM-EXECUTING SECONDARY SYSTEM CONTROLLING A PROGRAM-EXECUTING PRIMARY SYSTEM".

Prior art systems such as the one in U.S. Pat. No. 4,244,019 have provided methods and apparatus for controlling the operation of one computer by another computer in a data processing system in response to human intervention for maintenance or other reasons. Such methods and apparatus have not provided the flexibility and efficiency which is desirable for more efficient data processing systems.

In U.S. Pat. No. 4,244,019 the data processing system is formed with a first (primary) computer and with a second (secondary) computer. The first computer has instruction execution and processing apparatus operable to execute a first program formed as a first instruction stream. The second computer has instruction execution and processing apparatus for executing a second program formed as a second instruction stream. The second computer is typically a console which is capable, through its own program, to cause the execution of instructions and commands in the first data processing system and to cause the accessing of locations in the first data processing system using redundant connections and paths.

The primary function of the overall computer system in U.S. Pat. No. 4,244,019 is to execute the first (primary) programs in the first computer and the function of the second computer is to assist, control and interrogate the first computer.

Computers from time to time experience errors. In a system of connected computers, such as in U.S. Pat. No. 4,244,019, errors in one computer can cause delays in the operation of the other computers in the system thereby interfering with the primary function of the overall computer system. When a computer experiences an error, the typical operation is to suspend execution of the instruction stream for that computer so as to not cause any further errors. In a system, the suspension of operation of a second computer may slow down or stop the operation of a first computer, even when no errors exist in the first computer. When computers have been stopped, it is important to diagnose the problem and restart the computers for error free operation as quickly as possible. The diagnosis usually involves the scan-out and analysis of the state of many circuit locations in the stopped computer. The restarting of the stopped computer commences typically by an initial program loading (IPL) routine.

IPL routines for computers are well know. Typically, an IPL routine initiates the starting and distribution of clock signals, the resetting and clearing of many locations throughout a computer to establish initial conditions, and the downloading of control or other information and programs from disk or other memory. Each IPL routine is tailored to the particular computer which is being started or restarted.

The manual initiation of diagnosis and initial program loading for the restarting of a computer is often inefficient and interferes with or slows down the execution of primary programs in a primary computer. The inefficiency is particularly aggravated in a hierarchical system in which a second computer is controlling a first computer. If the second computer experiences errors, when the first computer is not, the second computers errors frequently interfere with the operation of the first computer thereby degrading the primary function of the overall system, that is, execution of programs by the primary computer.

In accordance with the above background, there is a need for an improved hierarchy of computers whereby operations of each of the computers leads to a more efficient overall system.

SUMMARY OF THE INVENTION

The present invention is a data processing system having a hierarchy of computers including a first computer, a second computer, a third computer, and a fourth computer. Typically, the first computer is a general-purpose, large-scale computer and the second computer is a smaller-scale general-purpose support computer for performing certain support operations in connection with the first computer.

Each of the first and second computers executes an independent instruction stream. The instruction stream for the first computer causes data manipulations with circuit locations associated with the principal function of the overall data processing system, namely, the execution of first programs in the first computer.

The instruction stream executing in the second computer performs support functions which assist and control the first computer and acts as an interface between the first computer and a human operator through a console including a terminal having a keyboard and a display.

The first computer includes first circuit locations having redundant connections independently accessible by the second computer under control of the second instruction stream and independent of the first instruction stream.

A third computer is provided for executing a third instruction stream. The third instruction stream and the third computer perform support functions which assist and control the operation of the second computer. The second computer includes second circuits having redundant connections independently accessible by the third computer under control of the third instruction stream.

The fourth computer is a state machine that displays the state of the third computer 28 on the bottom (for example 25th line) of the display terminal 12. The format of the display is a one line scanpage with hex fields including parity separated by spaces. It is typically implemented on one chip and uses a low number of gates in order to maximize its reliability and debuggability.

Whenever the second computer has an error or other conditions which stop the execution of the second program by the second computer, the third computer senses the second locations in the second computer and automatically scans out and restarts the second computer, for example, by causing an initial program load (ILP) routine to be executed for the second computer. In this manner, the second computer is restarted automatically under control of the third instruction stream executed by the third computer, without requiring interruption of the processing of a first program in the first computer.

When scan data is transfered to the third computer, the fourth computer automatically causes data to be displayed.

In accordance with the above summary, the objective of providing a data processing system formed of three or more computers with improved reliability and efficiency is achieved.

The foregoing and other objects, features and advantages of the invention will be apparent from the following detailed description in conjunction with the drawings.

BRIEF DESCRIPTION OF THE DRAWINGS

FIG. 1 depicts a block diagram of a computer system including first, second, third and fourth computers in accordance with the present invention.

FIG. 2 depicts a block diagram of the first and second computers of the FIG. 1 system.

FIG. 3 depicts a block diagram of the the independently accessible and redundantly connected locations and the scanner for accessing those locations within the second computer of FIG. 2.

FIG. 6 depicts a block diagram of a latch circuit which has independently accessible redundant inputs and outputs.

DETAILED DESCRIPTION OF THE DRAWINGS

System With Computer Hierarchy—FIG. 1

Figure 4:
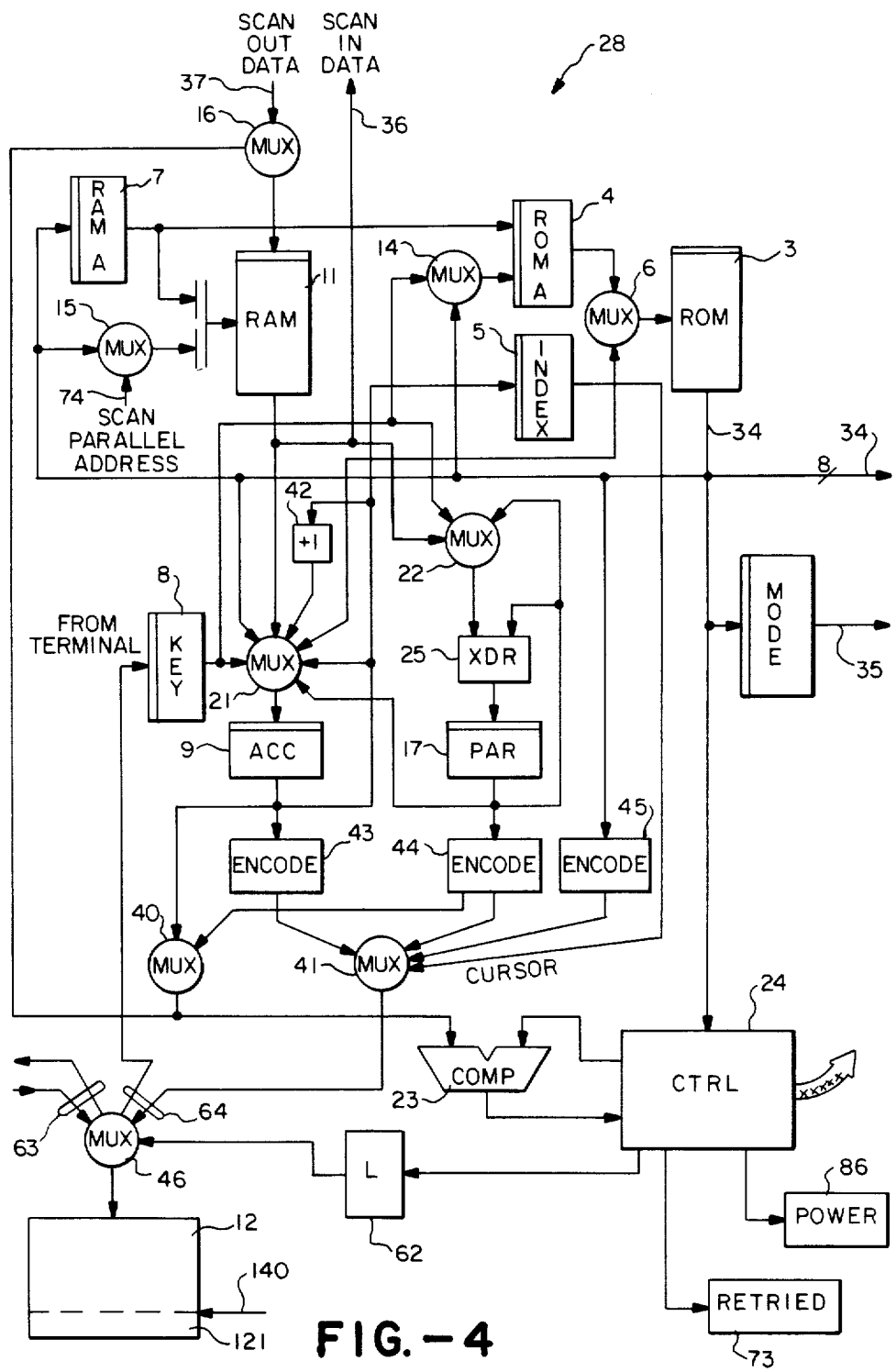
FIG. 4 depicts a block diagram of the third computer of the FIG. 1 system.

In FIG. 1, a first computer 26, a second computer 27, a third computer 28, and a fourth computer 129 are shown. The computer 26 is a conventional large-scale computer which runs in a conventional manner under control of an operating system and executes a primary (first) program formed as a first instruction stream.

In FIG. 1, the second computer 27 executes a second program, formed as a second instruction stream. Additionally, in FIG. 1 a third computer 28 executes a third program, formed as a third instruction stream, independently of the second instruction stream in second computer 27 and independently of the first instruction stream in first computer 26.

The first computer 26 and the second computer 27 include scan-in and scan-out apparatus and operate generally in the manner described in the above-identified U.S. Pat. No. 4,244,019. The third computer 28 performs functions to assist, control and monitor the second computer 27 in the manner described in the above-identified cross-referenced application entitled DATA PROCESSING SYSTEM HAVING A HIERARCHY OF SERVICE COMPUTERS.

In FIG. 1, the system 1 hierarchy is formed with the largest computer being the first computer 26, the next largest computer being the second computer 27, the next largest computer being the third computer 28 and the next largest computer being the fourth computer 129. Each of the first three computers in the hierarchy includes means for independently executing a different instruction stream. The first computer includes redundantly connected and independently accessible first locations accessible by the second computer under control of the second instruction stream. The second computer includes redundantly connected and independently accessible second locations accessible by the third computer under control of the third instruction stream.

The fourth computer 129 is a state machine that displays the state of the third computer 28 on the bottom (for example 25th line) of the display terminal 12. The format of the display is a one line scanpage with hex fields including parity separated by spaces. It is typically implemented on one chip and uses a low number of gates in order to maximize its reliability and debuggability.

Figure 5:
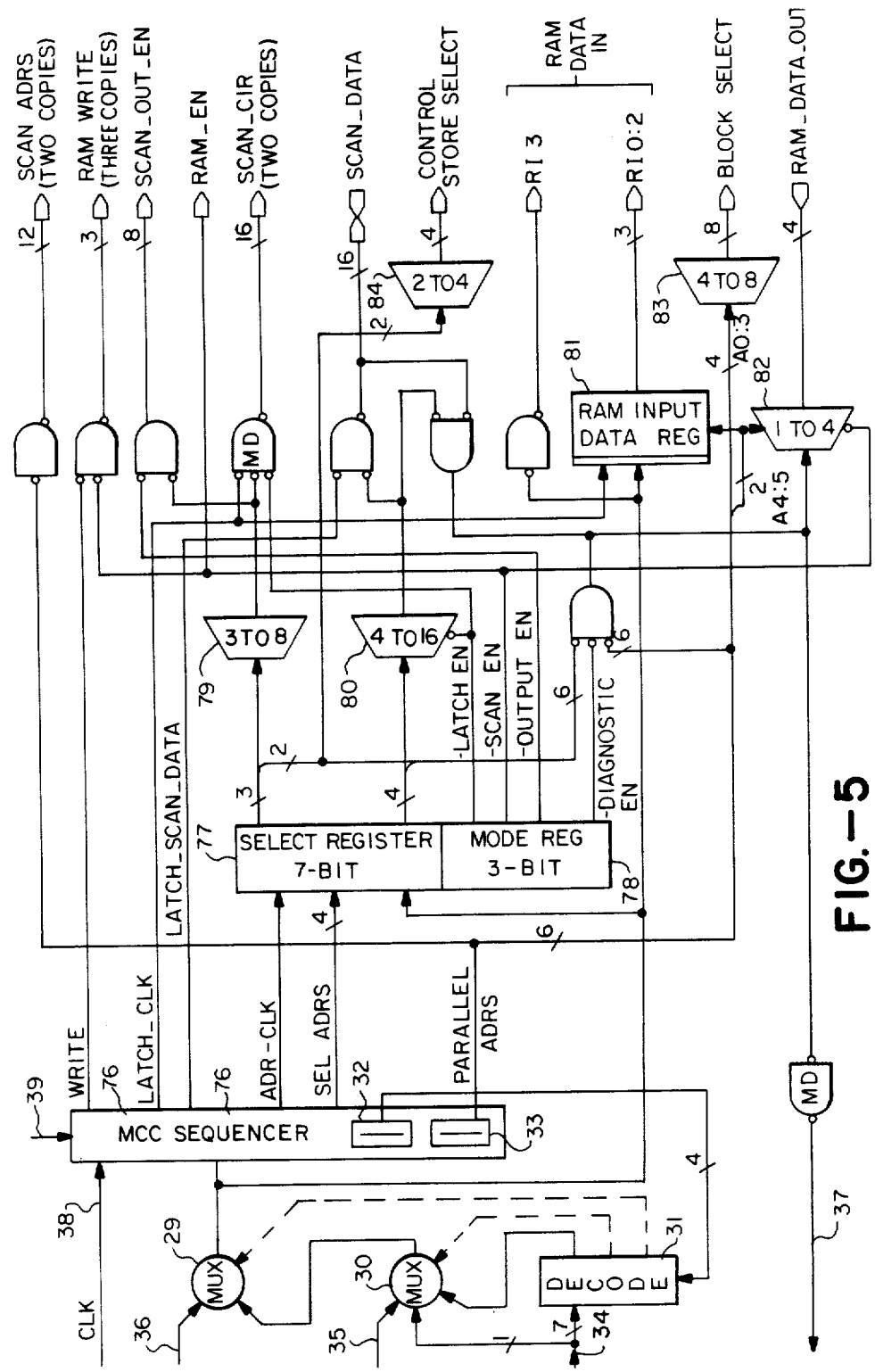
FIG. 5 depicts a block diagram of the scanner which forms part of the FIG. 3 circuitry.

The computer 129 uses the scan mechanism, which provides the latch values of the third computer to get data which it converts into a data stream compatible with the display 12. The formats of the scan data and the display 12 data streams are both serial and therefore it is easy to convert one to the other. The fourth computer includes two counters, one which counts each character on the screen of terminal and another which counts the individual bits of the character. These fourth computer counters are implemented in the same manner as the scan machine counters 32 and 33 of FIG. 5 such that they will generate the same sequence as the scan machine. This identical counting operation means that latches to be accessed by the fourth computer can be grouped into fields simply by assigning them sequential scan addresses. By carefully assigning latch scan addresses and polarity, decoding logic is minimized or eliminated. Parity over a field is provided by scanning out the result of the parity checker for that field. This scanning eliminates the need for any parity accumulation logic.

The fourth computer is unique because the scan data format is the same as or similar to the display data stream format (i.e. they both use a serial data format) so that no or little conversion logic is required, no memory storage is required except for the latches to implement the fourth computer itself. The fact that the scanpage formatting is done by carefully selecting the scan addresses and phases of the third computer latches means that no RAM or ROM to temporarily store data or hold scanpage formatting information is needed. Also if a suitable character code (for example, in which the characters '0-9,A-F' are encoded in hexadecimal order, character '0' having code x'x0' and character 'F' having x'xF') is selected then no accumulator is required since each scan bit is simply selected into the appropriate character bit location. Normal character sets such as ASCII, EBCDIC, or 3278 code, require that some bits be encoded from several scan bits which means that the scan bits must be stored temporarily in an accumulator until they are needed. The fourth computer takes advantage of the 3278 character set to provide the value of the parity latch in addition to the parity of the field. Instead of using the traditional '*' to indicate bad parity and ' ' to indicate good parity, the fourth computer uses a '*' to indicate bad parity in which the parity latch is 0, a '*' with a bar over it to indicate bad parity with the parity latch equal 1. It uses a ';' to indicate good parity with parity equal 0 and a ';' with a bar over it to indicate good parity with parity; equal 1. These characters are selected by changing just two bits in the character corresponding to the parity over the field and the value of the parity latch.

Primary and Secondary Computer Systems—FIG. 2

In FIG. 2, a primary and secondary computer system of the type described in the above-identified U.S. Pat. No. 4,244,019 is shown. The primary or first computer 26 has hardware components including circuit locations 68 which are organized in physical blocks 60-1, 60-2, ..., 60-M. Typically, each block 60 is a multiple chip carrier (MCC) which carries a number of large-scale integrated (LSI) semi-conductor chips. The semi-conductor chips include circuits having latches and memory locations which are directly interconnected to form a high-speed, large-scale computer. Many or all of the latches and other data locations within the first computer 26 include redundantly connected and independently accessible data inputs and/or outputs and control inputs and/or outputs which are independently accessible under control of the second computer 27. These redundantly connected inputs and/or outputs in the first computer 26 are in addition to the normal direct inputs and outputs of the circuits employed in connection with the primary operation of the first computer.

A typical circuit location in the form of a latch circuit 68 is depicted. The latch circuit 68 includes a direct data input, DI1, and a redundant data input, DI2. Latch 68 has a direct data output, DO1, and a redundant output, DO2. The SAMPLE, HOLD, and RESET signals are conventional control signals useful in the operation of the typical latch 68. In addition, latch 68 is addressable by independent addressing circuitry including the ROW, COL, and PS lines. These independently addressable inputs control the redundant inputs and outputs of the latch 68 separately from the use that the latch 68 has in the first computer 26 or in the second computer 27. The latch 68 of FIG. 6 is like that shown in FIG. 7 of the above-identified cross-referenced application entitled "SERIAL CHIP SCAN."

The primary operation of the first computer 26 is to support the execution of primary (first) programs in a first stream of instructions. Such primary programs carry out conventional computer operations including executing application programs for accounting, data processing, inventory control, data base management and so on. All of these primary functions are carried out independently of the redundantly connected data and control input and outputs associated with all or many of the circuits within the first computer. These locations 68 in the first computer (first locations) have values which are determined as a function of the first stream of instructions and the use of these locations is controlled by the direct connections to these locations under control of or in response to the first instruction stream. The accessing of these first locations by means of the redundant connections is under control of the second stream of instructions.

At the same time that the first computer 26 is operating to execute first computer programs, the second computer 27 is executing independently a second program by executing a second stream of instructions. The principal purpose of the second computer 27 is to monitor, control and diagnose the operation of the first computer 26. Frequently the second computer 27 is located in the console of an overall data processing system 1. The second computer 27, for example, monitors error conditions in the first computer 26, supervises the resetting of the first computer 26, and controls the initial program load (IPL) of the first computer 26. The manner in which the second computer 27 interfaces with the first computer 26 is like that described in U.S. Pat. No. 4,244,019.

Each MCC or block 60 of the computer 26 includes a scanner 66, including the scanners 66-1, 66-2, ..., 66-M corresponding to the blocks 60-1, 60-2, ..., 60-M. Each scanner 66 is able under control of the second computer 27, to access first locations within the corresponding block 60 through accessing of the redundant inputs and/or outputs of the circuit locations within the MCC block 60. In this manner, the computer 27 is able to access the circuit locations of the first computer 26 without, in general, interfering with the execution of the first stream of instructions by the first computer 26. Each of the scanners 66 connects to a multiplexer 61 which in turn connects to the second computer 27 and particularly to the core unit 58 of the second computer 27. The core unit 58 is like the secondary system in the above-identified U.S. Pat. No. 4,244,019.

The second computer 27 and particularly the core unit 58 from time to time experiences errors. Errors in the core unit 58 of the second computer 27 can prevent the second computer 27 from performing some task associated with the first computer 26, thereby interfering with the operation of the first computer 26, and thereby interfering with the primary function of the overall computer system 1, that is, to execute the primary programs in the first computer 26. When the second computer 27 experiences an error condition, one typical operation is to restart the second computer 27 without having the first computer system 26 suspend execution of the primary instruction stream. Such restarting operation of computer 27 avoids or reduces a slow down or avoids the stopping of the operation of the first computer 26 when error conditions are not present in the first computer 26. When the second computer 27 has been stopped, restarting of processing commences typically by an automatic initial program loading (IPL) of the second computer 27 under control of the third computer 28 without need for an initial program load (IPL) of and with a minimum of delays to the first computer 26.

Such automatic operation does not waste the execution time of the first computer 26 and is more efficient for the overall system 1.

In accordance with the present invention, the third computer 28 is interconnected to monitor and control the operation of the second computer 27 in a manner similar to that in which the second computer 27 monitors and controls the operation of the first computer 26.

In FIG. 2, the second computer 27 includes a scanner 56, which is like the scanners 66 within the first computer 26. The scanner 56 is capable of monitoring redundant data and control inputs and outputs at many locations within the second computer 27.

The computer 27 in FIG. 2 includes a core unit 58 which functions to execute a second stream of instructions independently of the first stream of instructions executed by the first computer 26.

The second computer 27 is physically the equivalent of an MCC block like one of the blocks 60 in the first computer 26. The second computer 27 has many redundantly connected and independently accessible latches and other locations 68 organized in the same manner as the latches of FIG. 4 of the above-identified application entitled "SERIAL CHIP SCAN." That organization of latches 68 is shown in FIG. 3 of the present specification. In FIG. 2, particular ones, latches 51, ..., 55, of the latches 68 of FIG. 3 are shown.

The structure and operation of scanners 66 in scanning error latches and other locations associated with a first computer 26 are described in detail in the above-identified application entitled "ERROR TRACKING APPARATUS IN A DATA PROCESSING SYSTEM". The second computer 27 includes a plurality of error latches 53, including the latches 53-1, ..., 53-N. The error latches 53 store data values of corresponding latches whenever an error has occurred and a corresponding latch or other data point within the second computer system.

Whenever an error occurs within the core unit 58, the error is recorded in one of the latches 53-1 through 53-N. The error latches are independently accessible locations in computer 27 which do not interfere with the normal, error-free functioning of the core unit 58.

Figure 7:
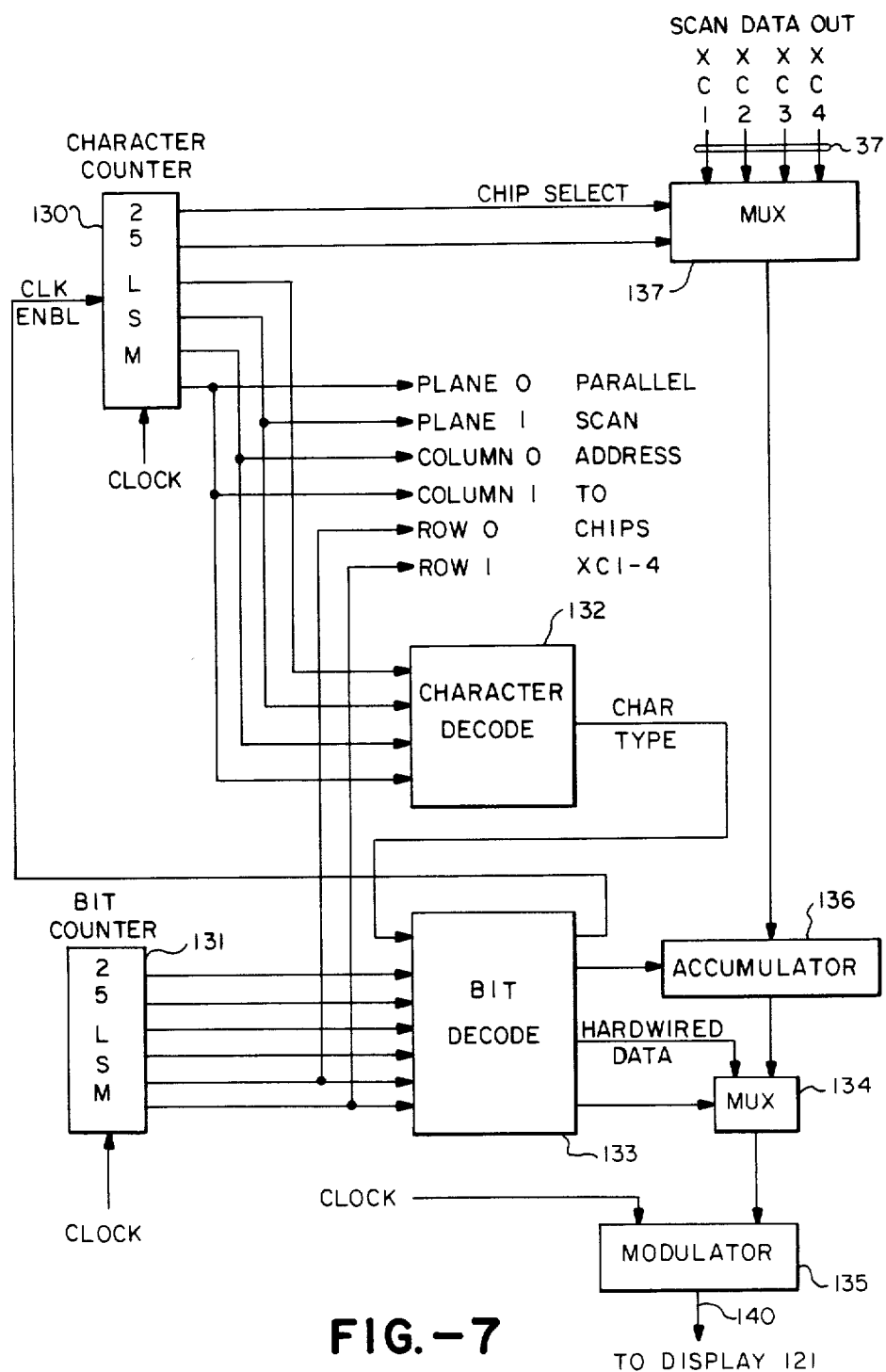
FIG. 7 depicts a block diagram of the fourth computer of the FIG. 1 system.

The latches 51 through 55 of FIG. 2, corresponding to specific ones of the latches 68 of FIG. 3, are of the type shown in FIG. 6 of the present specification and in FIG. 7 of the above-identified application entitled "SERIAL CHIP SCAN". The latches 68 provide redundant outputs DO2, not utilized in the primary functioning of the second computer 27, and which are accessible under control of the scanner 56 under control of the third computer 28. The above-identified application entitled "SERIAL CHIP SCAN" is hereby incorporated by reference for purposes of explaining the structure and operation of latches having direct and redundant inputs and outputs independently accessible by a scanner controlled in response to the execution of the program in another computer.

In the same manner that scanners are provided in the first computer 26 as described in the above cross-referenced applications, the second computer 27 similarly includes a scanner 56 and error latches 53. The scanner 56, in the second computer 27, is controlled by the third computer 28 of FIG. 1.

In the second computer 27 a clock control 57 is provided. The clock control 57 receives clock signals on lines 70 from the third computer 28. The clock control 57 delivers gated clock signals on lines 71 to the core unit 58 and ungated (free-running) clock signals on the line 72 to the core unit 58. The clock control 57 controls the distribution of and the synchronization of the gated and ungated clock signals on lines 71 and 72 in response to the setting of the gated and ungated latches 54 and 55. Whenever an error condition is detected in one of the latches 53, the error latch 88 is set and detected by clock control 57. In accordance with some predetermined sequence, the distribution of clock signals on lines 71 and 72 to the core unit 58 is controlled in response to an error signal from latch 88 or clock control signals from latches 54 and 55. The manner in which clock control 57, in response to error and other conditions, alters and synchronizes the distribution of clock signals can be carried out in any conventional manner. In one particular embodiment, clock distribution and synchronization is described in the above cross-referenced application entitled "A DETERMINISTIC CONTROLLER FOR AN INTERLEAVED ARRAY OF DYNAMIC RAMS".

In FIG. 2, the latches 51 and 52 store signals directly from the first computer 26 whenever, by operation of the first computer 26, it is determined that the second computer 26 is not functioning properly or for other reasons should be restarted. The first computer 26, under control of the first instruction stream executing in the computer 26, causes either one or both of the latches 51 and 52 to be set. Also, the latch 51 can be set via the input line 85 under control of the reset switch 75 associated with a the third computer 28. Both of the switches 72 and 75 are operative when the terminal 12 is associated with the third computer 28 under control of the latch 62 of FIG. 4.

Although not explicitly shown in FIG. 2, each of the latches 51 through 55 and 88 includes a reset input from the scanner 56 and are resettable, therefore under control of the scanner 56 in any conventional manner or in the manner described in the above-identified application SERIAL CHIP SCAN. Each of the latches 51 through 55 and 88 of FIG. 2 and more generally each of the latches 68 of FIG. 4 has a predetermined address. That predetermined address renders each of the latches 68 of FIG. 4 accessible by the scanner 56. Furthermore, the address locations of those latches have a predetermined mapping to predetermined addresses in the random access memory (RAM) of the third computer 28. Whenever a scan-out of the latches 51 through 55 and 68 of the second computer 27 occurs by the scanner 56, the state of those latches is recorded in the memory of the third computer 28. Similarly, for a scan-in operation, the contents of memory within the third computer 28 is loaded from the computer 28 through the scanner 56 into the latch and other locations of the second computer 27. All of the scan-in and scan-out operations are under the independent control of the third stream of instructions executed by the third computer 28 and are independent and transparent to the second instruction stream being executed in the second computer 27. Similarly, the second computer 27 is able to scan-in and scan-out latches in other locations in the first computer 26, under control of the second stream of instructions executed by the second computer 27, all independently of the operation of the first stream of instructions in the first computer 26.

Third Computer—FIG. 4

The third computer (XC) performs, resets and provides debugging capability for the service processor by providing a large subset of service processor functions that can be used on the service processor itself. These include reset, microcode loading and verifying (LMP), display/alter of scanned out latch values (scanpages) and service processor RAMs, clock control and monitoring error conditions.

Further details of the third computer 28 are shown in FIG. 4.

XC ROM. The XC ROM 3 is typically 256K×8-bit bytes of instruction code and data.

XC ROM ADDRESSING. The ROM address register (ROMA) 4 is used to address instructions in the third instruction stream and the index register 5 is used to address data. A multiplexer 6 selects either the ROMA 4 or index register 5 as the actual ROM address. The index register 5 is only selected during a LIX command. The ROMA 4 is normally incremented after every byte is fetched. The only time it is not is during a branch in which the branch address is loaded from ROM 3 by way of the instruction decode state machine in control 24 and the RAM address register (RAMA) 7 and directly from the ROM 3 data on bus 34 of FIG. 4. It is also not incremented during a BKEY instruction in which the key register 8 is loaded into part of the ROMA register 4. The index register 5 is 19 bits wide and selects a nibble within the addressed byte. The 12-low order bits are incremented by a LIX Instruction and nibbles are transferred between the accumulator 9 and the index register 5 by the LINDX and LDCUR instructions.

XC ROM DATA PATHS. Data from ROM 3 are either XC instructions, branch addresses, data, chip or latch subcommands, or display characters. XC instructions accessed from ROM 3 are decoded by the control 24 which also stores the invert mask specified in the PAR, HEX, STOR, CONST, and IF instructions. Branch addresses are stored temporarily in control 24 and the RAMA register 7. ROM data addressed by the index register 5 is loaded via bus 34 and multiplexer 21 into the accumulator 9. Chip subcommands are latched up in the RAMA register 7 and latch subcommands address the XC RAM 11 directly. Display characters are sent to the terminal 12 during a WRITE command.

XC RAM. The XC RAM 11 is organized as a string of 12288×1 bits. This string is divided into 192×64 bit chip locations, each location corresponding to the number of bits needed to hold an entire scan operation worth of data.

XC RAM ADDRESSING. The chip location is held in the RAM address (RAMA) register 7 which is loaded during chip subcommands. An individual bit (referred to as a latch since normally these bits correspond with the values of latches or other locations in the second computer 27) within the chip location is addressed by a latch subcommand which comes directly from the ROM 3. Since the chip location is latched it is not necessary to specify a chip subcommand for every latch subcommand if the bit is in the same chip location as the previously specified bit. Thus the notation "(chip)-@latch subcommand" is used to indicate a latch subcommand in which the chip subcommand is only required if the bit is in a different chip location. The RAM 11 is also addressed by the scanner parallel address which takes the place of the latch address during a scan operation. The multiplexer 15 selects between the ROM data on bus 34 for latch subcommands and the scan parallel address on lines 14 for scan operations.

XC RAM DATA PATHS. The RAM 11 input can come from several places. During a scan out operation the data comes from the scanner 56 via scan-out data bus 37. During a STORE or HEX command alter operation, data comes from the accumulator 9 via multiplexer 40. During a PAR command, the data comes from the parity accumulator 17 via encoder 44 and multiplexer 40. Data out of the RAM 11 goes to the scanner 56 via scan-in data bus 36 for scan in operations and to multiplexers 21 and 22 which select data into the accumulator 9 and parity accumulator 17.

ACCUMULATOR. The accumulator 9 is a four bit register which is used to move data from one place to another and to accumulate hex fields for display by the terminal 12. Accumulator 9 can be loaded serially from the RAM 11 during LOAD, HEX or PAR commands in display mode or in parallel from ROM 3 during an INCR instruction. Accumulator 9 is also loaded from the key register 8 in encoded form after a POLL Instruction and at the beginning of a HEX Instruction during alter mode. The accumulator 9 can store bits into the RAM 11 sequentially during STORE, HEX or PAR in alter mode or load the index/cursor register 5, or send hex fields to the terminal 12.

PARITY ACCUMULATOR. The parity accumulator 17 accumulates parity over bits that are moved between RAM 11 and the accumulator during HEX and STORE commands and displays or alters parity during a PAR command. Accumulator 17 is also used as a set/reset flag in conjunction with STORE commands to verify data.

KEY REGISTER. The key register 8 is loaded during a POLL command if a key was pressed on the keyboard 18 of terminal 12. This value can be loaded into the ROMA register 4 to decode a keyboard command or can be encoded and loaded into the accumulator 9. During a POLL command the index register 5 contains the current value of the cursor and is used to move the cursor around when the user presses the arrow keys on the keyboard 18.

| XC instruction set | |
|---|---|
| OPCODE | DESCRIPTION |
| POLL | Poll terminal and load key register with key value returned from keyboard if a key was pressed. Also sets XC alter/display mode depending on the key pressed. |
| LPAR | Load accumulator bit3 from the parity accumulator. Can be used to get parity of a field but is primarily used during a verify operation to determine whether there was a miscompare. |
| CHART | Write 3278 display character string. All bytes after this command are interpreted to be 3278 characters and will be sent to the display terminal. A byte of x'06' or x'07' will terminate the command. Bytes in the range x'60' to x'7F' are interpreted to be 3278 commands and will be sent as x'00' to x'1F' with the command bit turned on. |
| BKEY | Load ROM address register bits 9-15 with the key register and forces ROM address bits 16, 17 =0. This is used for decoding keyboard commands |
| LIX | Load accumulator indexed from ROM. The index register points to either the high order or low order four bits of a ROM location and this nibble is loaded into the accumulator. Bits 7-18 of the index register are incremented after the load. This is used for fetching microwords, nanowords, and latch reset values for loading into the service processor. |
| PAR m | Parity field, followed by one (chip)@latch subcommand. This command will display (as a '*' or ' ') or alter a parity field based on the specified latch modified by the invert bit m, the value of the parity accumulator and, in th case of an alter, the value of the key pressed (space for good parity, 'p' for bad parity). |
| MODE i/o | Set mode latch to in or out mode. The mode bit determines whether a scan command will do a scan in or a scan out. It is also used to set verify mode (in mode) which causes a store command to do a verify operation instead of a store operation. |
| LOAD n | Load accumulator with n latch values, n is from one to four. This first clears the accumulator and then shifts in n bits specified by n (chip)@latch subcommand which follow the load command. |
| LINDX n | Load index register nibble n from accumulator, n is from one to four. The value of n specifies which nibble of the index register gets loaded. Since there are five nibbles in the index register, the lowest order nibble is loaded from the next lowest. |
| BRXC adrs | Branch to adrs. |
| SCAN adrs | Scan adrs. The mode bit determines whether the operation is a scan out or a scan in. The scan operation transfers data between a chip or RAM on the MCC and a chip location in the XC RAM. It then increments the XC RAM address register to point to the next chip location. The address that is specified after the scan command is the scan row and column of the MCC chip. |
| IF m | If the accumulator is equal to m then do not skip the next three ROM locations else if it is not equal then skip the next three bytes of code. The three bytes of code immediately following the IF command are usually a branch so that the code will look like IF m then BRANCH. If the accumulator is not equal to m then the branch will not occur and execution will continue sequentially. |
| CONST m | Load accumulator with m. |
| INCR m | Increment accumulator. The contents of the accumulator are first exclusive ored with m then incremented and loaded back into the accumulator. |
| LDCUR n | Load accumulator from the cursor register. When n=1-3 the accumulator is loaded from the corresponding nibble of the cursor register (index register bits 6-17). This is used to save away the cursor value after a poll command so that the index register can be used for other purposes. When n=0 a value based on the index register which indicates the appropriate half-nibble to increment in order to generate a grey coded address is loaded. This is used for generating microstore addresses during microcode loading. |
| WDD n | Write direct data. This command is used to set certain latches directly. These latches are mostly used to control the display terminal. |
| STORE n m | Store accumulator bits. When the mode latch is in out mode, this command stores n bits from the accumulator into RAM locations specified by n (chip)@latch subcommands following the store command. The bits are exclusive-ored with the invert mask m before being stored. The parity accumulator accumulates parity over the stored bits. When the mode latch is in in mode, the store command works as above except that instead of storing bits into the RAM, each accumulator bit and its corresponding bit in the RAM are compared and if they are not the same, the parity bit is set. This is used for verifying that the microstore data is correct. |
| HEX n m | Hex field, followed by n (chip) @latch subcommands. This command displays or alters a hex field made up of bits specified in the latch subcommands after being exclusive ored with the invert mask m. Parity is accumulated over the specified bits. The accumulator shifts bits in from low to high and after the last bit is shifted in, the hex digit is converted to a 3278 character representing the digit and is sent to the display terminal. In alter mode the key register value is converted to a hex nibble and loaded into the accumulator at the beginning of the hex command and the bits are then stored into the RAM during the latch subcommands. |

SCAN Instruction

The XC uses a SCAN instruction in the form

OSCAN opcodeJOscan addressJ.

The function of this instruction is unique in that (1) it replaces code that would be required by a general purpose computer, (2) it is used for both input and output depending on a mode bit set by another instruction. A general purpose computer would use at least some separate code for input and output, (3) is independent of the format of the scan data. These conditions mean that the scan protocol can change, but architecturally the XC code does not have to change. A general purpose computer having the scan protocol imbedded in code would have the code change if the scan protocol changed.

HEX Instruction

The XC uses HEX instructions of the form

OHEX n m opcodeJ

O(chip)@latch 0 subcommandJ..O(chip)@latch n subcommandJ where n is the number of latches in the HEX field and m is an invert mask. This instruction is used to display and alter hex fields composed of bits representing latches specified by the latch subcommands following the HEX command. The HEX instruction is unique because (1) It replaces code that would be required on a general purpose computer, (2) it is used for both input and output depending on a mode bit set by another instruction while a general purpose computer must use at least some separate code for input and output, (3) parity over the hex field is accumulated automatically in a parity accumulator. A general purpose computer would accumulate parity separately.

PAR Instruction

The XC uses PAR instructions of the form

OPAR m opcodeJO(chip)@latch subcommandJ where m is an invert mask for the latch subcommand. The PAR command is used to display and alter the parity value of a field. Field parity comes from the parity accumulator and the parity value is specified by the latch subcommand following the PAR command. The PAR command displays good or bad parity or alters the parity latch to good or bad parity. The PAR Instruction is unique because (1) It replaces code that would be required on a general purpose computer, (2) It is used for both input and output depending on a mode bit set by another instruction while a general purpose computer would use at least some separate code for input and output, (3) The code is independent of the parity accumulation method.

WRITE Instruction

The XC uses WRITE(CHART) instructions to send character strings to the display terminal. The format is OWRITE opcodeJO3278 character stringJ While a general purpose computer does send character strings to a terminal, this function is usually handled by a complier or other program. The XC is unique in that this function is done at the machine language level.

Hardware Grey Code Logic

The XC loads microcode by grey coding the microstore address instead of incrementing the address. This coding saves time since only one chip needs to be scanned in to change an address instead of many. Since the XC fetches microcode from ROM using the index register and that index register is incremented, there is a correlation between the value of the index register and the address in microstore to which this data is to be loaded. Therefore it is possible to determine which chip to update based on the value of the index register. Since each address chip contains two bits of the microstore address, a base four grey code is used as follows:

Values are given in base 4.

| Index | Grey | Index | Grey | Index | Grey | Index | Grey |
|-------|------|-------|------|-------|------|-------|------|
| 000   | 000  | 020   | 022  | 100   | 130  | 120   | 112  |
| 001   | 001  | 021   | 023  | 101   | 131  | 121   | 113  |
| 002   | 002  | 022   | 020  | 102   | 132  | 122   | 110  |
| 003   | 003  | 023   | 021  | 103   | 133  | 123   | 111  |
| 010   | 013  | 030   | 031  | 110   | 103  | 130   | 121  |
| 011   | 010  | 031   | 032  | 111   | 100  | 131   | 122  |
| 012   | 011  | 032   | 033  | 112   | 101  | 132   | 123  |
| 013   | 012  | 033   | 030  | 113   | 102  | 133   | 120  |

The grey code changes only one digit at a time and this digit is determined by the base 4 value. The digit that is changed is selected by the lowest order base 4 digit that is not zero. The logic equations that implement this operation are as follows:

```
In   = Index register digit n (base4)
InH  = Index register high bit of digit n
InL  = Index register low bit of digit n
Gn   = Increment grey code digit n (base4) bit
GAn  = GInH  &  GInL
             &  GAn-1   This digit=0 and all preceding=0
Gn   = GGAn  &  GAn-1   Increment this digit if this
                        digit G=0 and all preceding=0
```

Alter and Display Use the Same Code

The XC uses the same code for altering and displaying hex and parity fields specified by HEX and PAR instructions. This sharing is an advantage because it saves code and makes the code somewhat independent of the actual display and alter mechanisms.

Alter/display is controlled in the XC by a state machine in control 24 which determines what mode that XC is in. This state machine has four states which are: ROLL, DISPLAY, ALTER SEARCH, and ALTER CHANGE. The POLL state is entered by executing a poll command (opcode=0). The state machine will poll the terminal for a key and will change state based on the value of the key returned. The state machine in Control 24 recognizes three kinds of keys: cursor (up, down, left, and right arrows), data (0-9, A-F, P, ' ' keys), and command (any other key). If a cursor key is pressed the state machine will move the cursor as indicated and will stay in the POLL state unit either a data or command key is pressed. If a command key is pressed it will enter the DISPLAY state and if a data key is pressed it will enter the ALTER SEARCH state. This operation is what determines the difference between alter and display. In DISPLAY mode, HEX and PAR commands accumulate latch values in a four bit accumulator 9 of FIG. 4 plus parity accumulator 17 of FIG. 4 and display hex or parity fields from these accumulators. In ALTER SEARCH mode, HEX and PAR commands work the same way except that the actual displaying of data is suppressed. In addition there is a function called cursor match which is being done that matches the current cursor location (the location on the screen that was altered) to a particular HEX or PAR command. This operation is called ALTER SEARCH. When the cursor matches the state machine moves to the ALTER UPDATE state. This operation causes the HEX or PAR command to fetch the hex or parity data from the key register 8 which holds the value of the key that was pressed. This value is then stored into the RAM 11 locations specified by the latch subcommands after the HEX or PAR command. Also at this time, a flag is set which causes the parity accumulator to accumulate the difference in parity between the old and new data instead of just the parity of the old data. This flag stays set until the next parity field is encountered at which time the parity bit will be updated with the parity over the new field.

Automatic Parity Accumulation Logic (Display and Alter)

All parity operations involving a display field are transparent to the code. That is code the should look like this:

```
WRITE ' '        the WRITE command delimits fields
HEX  latch subcommands                  -+
HEX ...                                  @
.    as many HEX commands as needed      @    This is a field
.                                        @
PAR  latch subcommand                   -+
DISPLAY -
```

At the beginning of the field, the WRITE command clears the parity accumulator. During the HEX commands, each latch subcommand will shift a bit into the accumulator 9. Also the parity accumulator 17 will be loaded with that bit exclusive or'ed with the parity accumulator 17 for each bit loaded into the accumulator 9. Parity is not cleared after a HEX command so that parity will be accumulated over multiple HEX commands. When a PAR command is executed, the bit specified in the following latch subcommand is exclusive nor'ed (since we use odd parity) to generate a signal indicating that this field has good parity (=0) or bad parity (=1). This signal causes either a blank or a parity splat to be sent to the display terminal.

ALTER

During alter mode, the parity accumulation is affected by four signals: the ALTER SEARCH and ALTER UPDATE signals from the state machine of control 24, HEX START which indicates the beginning of a HEX command, and UPDATE which is a flag set when ALTER UPDATE state is entered. During ALTER SEARCH, the parity accumulator 17 works the same as in display mode. If the XC finds a HEX field which matches the cursor position then it enters ALTER UPDATE. At this point, a hex field is changing and this may change the sense of the parity bit, so difference in parity between the old field and the new field is accumulated. The first thing done is to clear the parity accumulator 17 since any hex fields that came before the one that is altered will not alter the parity (the only field that can alter the parity bit is the current one since it is the only one that is altered). This operation is indicated by ALTER UPDATE & HEX START (ALTER UPDATE is active only during this hex command). During the subsequent latch subcommands, the state machine will go from ALTER UPDATE to ALTER SEARCH but the UPDATE flag which was set at the beginning of the HEX command will stay set. This operation indicates to the parity accumulator 17 to accumulate zeroes since no hex field thereafter will affect whether the parity bit needs to be inverted (=1) or not (=0). When the PAR command is encountered with the UPDATE flag on, the PAR command takes the old bit specified by the latch subcommand, exclusive ors it with the parity accumulator and the UPDATE flag so that it will work normally again. Note that any inversion specified in the PAR command has no effect during UPDATE since this is independent of whether the parity needs to be flipped or not.

Cursor Register and Tracking Logic

The XC used hardware to track and move the cursor around on the display terminal in response to cursor keys being pressed. There are two parts to this logic. The first part is the cursor register and its increment/decrement logic and the second part is a state machine which sends the set cursor commands and cursor register values which actually move the cursor on the display terminal.

This function is activated when the XC executes a POLL command and a cursor key is pressed and sent back to the XC during the POLL command. Executing the POLL command causes the terminal state machine to enter the POLL state and when the cursor key is detected three things happen. First the cursor register is updated based on which cursor key was pressed (On the 3278 terminal the top left hand position corresponds to cursor location x'050'. Cursor positions increment to the right and down to the bottom left position which is x'7CF'). Up arrow will cause 80 to be subtracted from the cursor, down arrow will add 80 to the cursor, left arrow will subtract one, and right arrow will add one. There is also overflow/underflow logic which detects whether the cursor is being moved off the top or bottom of screen and puts the cursor at the correct position on the bottom of the screen (e.g. if cursor=x'050' and left arrow is pressed, the cursor will be loaded with x'7CF').

The second thing that happens is that the set cursor state machine is started which sends the set cursor commands along with the updated cursor value to the terminal. The third thing that happens is that the terminal state machine will poll the terminal again and will keep polling until a key other than a cursor key is hit. If a cursor key is hit the cursor register will be updated as in step one above and written out as in step two and will keep polling.

Index Register and Cursor Register Use Same Physical Latches

Since the cursor register and the index register are never used at the same time, these two registers can share the same physical register 5. The cursor is only used when the XC is talking to the terminal (either after a cursor key or a data key was pressed) and the index register is only used to load latch or RAM values into the computer 27 which does not require the use of the terminal. The XC code must then load and save the cursor/index register based on what the code is doing. For instance, just before it issues a POLL command, the XC first loads the cursor register with the current cursor value. After the POLL command the XC will save it away until the next POLL or alter needs to be done. At the beginning of the load microcode code, the XC will load the starting ROM address of the microcode into the index register.

Verify Logic So That Load and Verify Use Same Code

One of the functions of the XC is to verify that what was scanned into the second computer 27 is the same as is in the XC's ROM. The XC uses logic which modifies the STORE command to do a verify instead of a store. This operation is under the control of a mode bit. The STORE command is followed by from one to four latch subcommands and it stores bits from the accumulator into XC RAM locations corresponding to the latch subcommands. In verify mode it doe not store but instead compares the bit in the accumulator with the corresponding bit in the XC RAM and if they are different it sets the parity accumulator. The parity accumulator does not accumulate parity in this mode but instead becomes a set only latch if there is a miscompare.

The code for loading microcode is as follows:

| Set up index register | | |
|---|---|---|
| ... | | |
| MODE | out | put XC in load mode |
| LIX | | put microcode in acc. |
| STORE | MS.bit0,bit1,bit2,bit3 | store acc. in XC RAM |
| ... | | |
| SCAN | in,MS | SCAN in microstore from XC RAM |
| The code for verifying is as follows: | | |
| set up index register | | |
| ... | | |
| SCAN | in,MS | SCAN out microstore |
| ... | | |
| MODE | in | put XC in verify mode |
| LIX | | put microcode in acc. |
| STORE | MS.bit0,bit1,bit2,bit3 | verify acc with XC RAM |
| ... | | |
| LPAR | | move par acc. to acc. |
| IF | 1 | if 1 then |
| BRXC | miscompare | branch to error code |

The STORE command in verify mode could be made to store the accumulator data as it verified it, but we chose not to so that the bad data would still be in the XC RAM and we would not have to re-fetch it if there was an error.

Hardware Parsing of Keyboard Commands

The XC uses single key commands. Therefore, the function to be performed is known to hardware since the key value is stored in a key register. This allows the POLL command (which reads the key from the keyboard) to set the terminal state machine to the appropriate state. It also allows the use of a branch on key (BKEY) instruction in conjunction with a branch table to decode commands.

The POLL instruction polls the keyboard and loads the key register with the key value. If the key is a command key the terminal state machine goes to the DISPLAY state and the POLL command returns a value of x'1' in the accumulator. This tells the XC to use the BKEY instruction. If the key is a data key then the terminal state machine is put in ALTER SEARCH mode and a value of x'3' is returned in the accumulator. This causes the XC to do the current display but check to see if it was altered afterwards and do a scan in if so. If a cursor key was pressed the XC hardware handles this and is transparent to the code. If no key was pressed, the POLL command will return zero in the accumulator which indicates to the SC that it should redisplay the last display it did.

Invert Mask Specified In HEX, STORE, PAR Instructions

The XC needs to specify a latch value as being inverted or not inverted whenever it is used. For instance a scanpage field may specify a latch to be displayed inverted if the logical or physical values of a latch are inverted. Since this operation occurs often we can specify an inversion bit for each latch. This operation is done in the HEX, PAR or STORE command instead of the latch subcommands themselves because the command is held in an instruction register through all latch subcommands and it is a simple matter to exclusive-or an invert mask which is part of the command with the corresponding accumulator bit.

Latch Addressing Using Chip And Latch Subcommands

Physical latches are not addressed directly by the XC. Instead if a certain latch is required then the entire chip which contains that latch is scanned out into the XC's RAM using a SCAN command to specify which chip to scan out. The individual latch can then be accessed by using chip and latch subcommands. They are called subcommands because they always follow either HEX, PAR, LOAD, or STORE commands. The chip subcommands select a 64 bit long location in the XC RAM. The latch subcommands select an individual bit within this 64 bit location. The addresses specified by the chip subcommands do not correspond to the physical scan address to the chip but rather to the order in which the chip was scanned in the list of scan commands. For instance suppose we scan out chips GLU1, GLU2, and GLU3 with physical addresses x'3C', x'33', and x'3B ' respectively into RAM chip locations X'00', x'01', and x'02' respectively. If we wanted to load latches x'03' and x'04' of chip GLU2 into the accumulator the code is as follows:

| loc. | code(hex) | |
|---|---|---|
| 0 | 11 | LOAD 2 bits into accumulator command |
| 1 | 01 | chip subcommand (GLU2) |
| 2 | 83 | latch subcommand (x'03') |
| 3 | 84 | latch subcommand (x'04') |
| 4 | xx | next command |

This code shows two things. First a chip subcommand is differentiated from a latch subcommand by the high order bit of the subcommand. This differentiation works because the chip address is seven bits and the latch address is six bits. Second a chip subcommand is not needed for every latch subcommand. Most of the time the next latch specified will be on the same chip as the previous one. The chip address is latched during the chip subcommand and stays the same until the next chip subcommand. Therefore the chip subcommand at locations 1 refers to GLU2. Note also that when referring to chip subcommands, actual chips can be referenced even though RAM locations are specified because the mapping of physical chip to RAM location is known.

Scan-in Only Chips That Change Logic Using Start Bit Flag

When changing a scan page it is a requirement to scan in only those chips that have actually changed. An automatic method of determining whether a chip has been changed is employed. The automatic method uses a specific bit in the 64 bit chip location in the XC's RAM as a flag to indicate whether this chip location had been modified. This bit, called the start bit because it corresponds to the first bit scanned in or out during a scan operation, is unused by the scanner 56 (the scanner substitutes a hardware generated zero for this bit), is reset by doing a scan-out operation. If this chip is immediately scanned in, the scan in operation will be made a no-op and the chip will not be changed. The assumption here is that since the data that is to be scanned in is exactly the same as that scanned out (This being indicated by the fact that the start bit is reset) and (presumably) the same as the data actually in the chip, there is no need to actually scan-in. If the start bit is set, then an actual scan-in operation would occur.

The conditions for doing an actual scan in (i.e. setting the start bit) occur if a bit in an XC RAM chip location is modified. The only operaions that modify XC RAM bits are STORE, HEX, and PAR (HEX and PAR commands act like STORE commands when in update mode). So, therefore, these commands need to set the start bit of the chip location in XC RAM. However, more than one chip location may be modified by a single command if they have chip subcommands which change the current chip. So, therefore, it is the chip subcommand which actually causes the start bit to be set in the new chip locaion. Note that even if the new data stored is the same as the old data so that the data has actually not changed, the start bit will still be set. Also, since the XC RAM chip location is held between commands, it is necessary to have a chip subcommand before the first latch subcommand even if the chip location does not change so that the start bit for this location will be set. This is really only a problem for HEX and PAR commands and so as a programming rule, we require a chip subcommand as the first subcommand after the HEX or PAR command even if the chip is the current chip.

The start bit is also a convenient bit to choose for this function because when the scan machine is in its idle state, it has the address of the start bit on its parallel address lines. Since these lines go through a mux into the XC RAM address it is only a matter of switching the mux to the scan machine during a chip subcommand to put the correct address into the RAM. Thus this function requires very little logic to implement.

Use Ram Address Register To Temporarily Hold ROM Branch Address

Since XC ROM addresses are 18 bits wide and the ROM data width is eight bits, it takes three cycles to fetch a complete branch address from the ROM. Therefore, it is necessary to temporarily store part of the branch address (at least 10 bits). The last eight bits fetched can be latched directly into the ROM address register. Two bits can be latched temporarily in the XC's instruction decoding state machine by providing four opcodes for branches. The remaining eight bits need to be latched for one cycle. We chose to use the RAM address register to do this since in the original inception, branch instructions were only needed to move between different algorithms and it did not matter if the contents of the RAM address register were lost. This saves having to add an extra register just for this function and the above restriction still holds true for most SC algorithms. The only problem occurs when we try to index the XC RAM. It is not possible to have a loop in which we do some operation on a chip location then increment the chip location and do this for all chip locations. This is because when we branch back to the top of the loop, the chip location will be destroyed and will have some set value depending on the address of the loop in ROM. This affects algorithms such as the SIC/SOC display in which we want to scan all chips and display them in raw format. We would like to scan out all chips and then have a loop which increments through all chips using a short piece of code which displays a single chip location. This problem is compounded when multiple chips are involved and there are index values in XC RAM which are on other chips entirely.

Further details specifying the exact logic and the state machine within the control 24 of FIG. 4 are shown in the above-identified application entitled DATA PROCESSING SYSTEM HAVING A HIERARCHY OF SERVICE COMPUTERS.

Exemplary details of the first computer 26 and the second computer 27, executing first and second instruction streams, are described in the above-identified U.S. Pat. No. 4,244,019.

In conjunction with any first and second computers of the type described, a third instruction stream which executes in the third computer 28 is shown by way of example in the following TABLE 1.

TABLE 1

$M_0$ STARTXC
$M_1$ IDLEXC
$M_2$ CTRLXC
   $M_{2,1}$ LOAD FEKEY
   $M_{2,2}$ IF 1, FEKEY
   $M_{2,3}$ BRXC, FEXC
   $M_{2,4}$ LOAD RETRIED
   $M_{2,5}$ IF 1, RETRIED
   $M_{2,6}$ BRXC ABORTXC
   $M_{2,7}$ LOAD ESPSTRT
   $M_{2,8}$ IF 1, ESPSTRT
   $M_{2,9}$ BRXC, IPLXC
   $M_{2,10}$ LOAD CHKSTP
   $M_{2,11}$ IF 1, CHKSTP
   $M_{2,12}$ BRXC, IPLXC
   $M_{2,13}$ BRXC, IDLEXC
$M_3$ FEXC
$M_4$ IPLXC
$M_5$ ABORTXC

In TABLE 1, a typical program is shown which executes in the third computer 28. The function of the program of TABLE 1 is to monitor the operation of the second computer 27 of FIG. 1. The program of TABLE 1 includes a number of macro instructions, $M_0$, $M_1$, $M_2$, ..., $M_5$. Each macro instruction includes a number of instructions which are grouped together to perform certain functions.

The STARTXC macro instruction, $M_0$, functions to do all required initiation functions such as setting the RETRIED latch 86 of FIG. 2 to 0 (SETL 0 RETRIED). The $M_0$ macro monitors the START latch 89 which is set by switch 74 and reser by STARTXC after initiation has begun.

The IDLEXC macro-instruction, $M_1$, functions to continuously execute in a loop made when the second computer 27 is functioning in an error free, normal mode. When not operating in the normal mode or when other operations are to be performed by the third computer 28, the program exits the $M_1$ instruction and enters the $M_2$ macro instruction, CTRLXC. The $M_2$ macro instruction includes, for example, a number of test sequences for determining what other macro instruction should be performed when the program is not operating in the idle mode of the $M_1$ instruction.

For example, the instructions $M_{2,1}$, $M_{2,2}$, and $M_{2,3}$ test to determine whether the FEKEY switch 72 of FIG. 1 has been enabled. If so, a branch is taken to the FEXC macro instruction, $M_3$. The $M_3$ macro instruction includes instructions which enable a field engineer to manually and otherwise control the operation of the system 1 of FIG. 1.

In TABLE 1, the instructions $M_{2,4}$, $M_{2,5}$, and $M_{2,6}$ test to determine if the RETRIED latch 73 has been set to a 1. The RETRIED latch 73 is set if an IPL of the second computer 27 has been tried a predetermined number of times, for example, 16 without success. If the IPL has not been successful after 16 tries, no further attempt is made at the IPL and the code branches to the ABORTXC macro instruction, $M_5$, which terminates any attempt to automatically restart the second computer 27 without external intervention.

In TABLE 1, the instructions $M_{2,7}$, $M_{2,8}$ and $M_{2,9}$ test the condition of the ESPSTRT latch. The EPSTRT latch is set to 1 whenever the first computer 26 or some other source has signalled a request that the third computer 28 restart and IPL the second computer 27. If ESPSTRT is set to 1, then the third instruction stream of TABLE 1 branches to the IPLXC macro instruction, $M_4$. The macro instruction $M_4$ includes IPL instructions for clearing, resetting, loading from disk and/or ROM the programs and information necessary to reinitiate operation of the second computer 27.

In TABLE 1, the instructions $M_{2,10}$, $M_{2,11}$, and $M_{2,12}$ test to determine whether or not the gated clocks in the second computer 27 have been stopped and, if so, branch to the macro instruction $M_4$ for a restart IPL of the second computer 27. If none of the branch conditions have been taken prior to the instruction $M_{2,13}$, then the CTRLXC macro terminates by branching to the IDLEXC macro instruction $M_1$. Further details of the macro instruction $M_1$ are described in connection with the following TABLE 2 where the "*" denotes comments that are not part of the code.

TABLE 2

```
IDLEXC  M1,1   CONST   C
       *RELEASE TERMINAL
        M1,2   WDD     1
        M1,3   SETL    ,XCSYS0.ESPSTRT,0,IFAIL,0,XCSYXS.CHKSTP,0,
                       POWR, 1
IDLOOP  M1,4   SCAN    OUT,CLEAR,,CCNT,ERR
        M1,5   LDCUR   0
        M1,6   STORE   8,XCSYS0.FEKEY,XXXXX,XXXXX,XXXXX
        M1,7   IF      0,CCNT.GATD
        M1,8   BRXC    IDCHK
       * CHECK POWER-ON LATCH
        M1,9   IF      0,POWR
        M1,10  BRXC    IDEND
       * SCAN OUT OR OTHERWISE OBTAIN THE ESP SIGNAL
        M1,11  IF      0,ERR.IPUP,IPDP
        M1,12  BRXC    IDLOOP
       * HANDLE THE ESP FLAG BEING SET
        M1,13  SETL    ,XCSYS0.ESPSTRT,1
        M1,14  BRXC    IDEND
IDCHK   M1,15  SETL    ,XCSYS.CHKSTP,1
IDEND   M1,16  SETL    ,XCSYS0.SHIFT,0,IFAIL,1
```

The $M_{1,1}$ instruction CONST loads a constant into the accumulator 9 of FIG. 3 equal to C hex which is the equivalent of decimal 12.

The $M_{1,2}$ instruction WDD functions to write direct data which causes the contents of the accumulator 9 to be written into the state machine of control 24 in FIG. 3. The control 24 receiving WDD1 together with the accumulator contents causes the control 24 to set a latch 62 of FIG. 4 which controls through multiplexer 46 access to the terminal 12. This latch 62, when set, allows the third computer 28 of FIGS. 1 and 4 to gain access to the terminal 12 via lines 64. When the latch 62 is reset, the second computer 27 has access to the terminal 12 via lines 63 and the computer 28 is excluded. After the $M_{1,2}$ instruction of TABLE 1, the computer 27 has access to the terminal 12.

The $M_{1,3}$ instruction SETL is used for setting latches which are defined locations in the RAM 11. These locations in RAM 11 are cleared by the SETL instruction so that they can be used to store information hereinafter described. The ESPSTRT location is used to signify that the computer 26 or some other source has requested that the computer 28 IPL the computer 27. The ESPSTRT location in the RAM 11 corresponds to the latch 51 of FIG. 2. When the state of latch 51 is scanned out by the scanner 56, the 1 or 0 value of latch 51 becomes stored into the ESPSTRT location in RAM 11.

The IFAIL location in RAM 11 is set when any errors occur in computer 27. The IFAIL location is set whenever any one of the history latches, like history latches 51-3 through 53-N in FIG. 2 are set. The IFAIL location in RAM 11 is set when the scanner 56 of FIG. 2 scans out the history latches 53-1 through 53-N.

The CHKSTP location in RAM 11 is set whenever the computer 27 clock has stopped. The CHKSTP location is set when the latch 54 of FIG. 2 is scanned out by the scanner 56.

In the SETL instruction, XCSYS0 corresponds to a chip location and ESPSTRT specifies a latch location on that chip. In the case of IFAIL, in the $M_{1,3}$ instruction no chip location has been specified, and hence the same chip location, XCSYS0, is implied as for the previous entry, ESPSTRT. Similarly, XCSYS corresponds to a chip location and CHKSTP corresponds to a latch location on that chip.

The loop, IDLOOP, commences with the $M_{1,4}$ instruction SCAN OUT which scans out the clock control chip (CCNT) 50 and the error chip (ERR) 49. The clock control chip 50 contains the clock latches 54 and 55 and the power-on latch 73, and the retried latch 86, and the error chip 49 contains the error history latches 53 and the IPUP and IPDP latches 51 and 52.

The $M_{1,5}$ instruction LDCURO loads the accumulator 9 with values from the keyboard 18 (including the FE key 72) and the $M_{1,6}$ instruction STORE specify four latches including the two latches XCSYS0-.FEKEY. The $M_{1,4}$ and $M_{1,5}$ instructions obtain the value of the FEKEY switch 72 from the third computer 28 and sets the latch FEKEY in RAM 11.

The $M_{1,7}$ instruction, IF checks to determine if the state of the gated clock latch is 0, that is, 0,CCNT.GATD.

The $M_{1,8}$ instruction, BRXC, is a branch to IDEND. The two instructions $M_{1,7}$ and $M_{1,8}$ together are read "if CCNT.GATD is equal to 0 then branch to IDCHK." If the gated clocks are off, then the second computer 27 has stopped executing the second instruction steam and the branch is taken to IDCHK.

The $M_{1,9}$ instruction IF has no chip specified and therefore implies the same chip as before, CCNT. The $M_{1,9}$ instruction tests for the power-on latch POWR in RAM 11 to be on, 0,POWR, and then, if on, the $M_{1,10}$ instruction branches to IDEND.

The next thing done in the second instruction stream of TABLE 2 is to check the value of the ESP restart signal. This signal comes from the first computer to request the third computer to IPL the second computer. The $M_{1,11}$ instruction determines if either of the latches IPUP and IPDP in RAM 11, which corresponds to the ESP restart signals coming from the UP side 26-1 and the DP side 26-2, respectively, of the first computer 26 is 0. If both are 0, then no restart occurs and $M_{1,11}$ instruction branches to IDLOOP which is instruction $M_{1,4}$. If either one of IPUP or IPDP is 1 then a restart of computer 27 is needed and the instruction sequencing falls through to the next instruction, $M_{1,13}$, a set latch instruction which sets the ESP start latch, ESPSTRT, to 1 so as to cause an IPL of the second computer 27 in the TABLE 1, instruction processing. Instruction $M_{1,4}$ branches to IDEND.

The $M_{1,15}$ instruction IDCHK, branched to after determining the value of the gated clock latch as a 0, sets the latch XCSYS. CHKSTP in RAM 11. That latch indicates that the second computer 27 was check stopped, that is, the clocks stopped suddenly. After such an occurence, a restart and IPL of second computer 27 occurs through the processing of TABLE 1. At IDEND, instruction $M_{1,15}$ sets a latch, SHIFT, representing a shift off and also sets the IFAIL which indicates that error occurred. field. Instead of using the traditional '*' to indicate bad parity and ' ' to indicate good parity, the 25LSM uses a '*' to indicate bad parity in which the parity latch is 0, a '*' with a bar over it to indicate bad parity with the parity latch equal 1. It uses a ';' to indicate good parity with parity equal 0 and a ';' with a bar over it to indicate good parity with parity; equal 1. These characters are selected by changing just two bits in the character corresponding to the parity over the field and the value of the parity latch.

Fourth Computer-FIG. 7

Character counter. The fourth computer 129 of FIG. 1 is shown in further detail in FIG. 7. The fourth computer 129 includes a character counter 130 which typically is a six bit counter which uses the modified grey code that is used by the scanner 56 of FIG. 6. Each half-nibble is a grey code counter and the next highest half-nibble is incremented whenever all the preceding low order half-nibbles are equal to three. The three half-nibbles are called chip Select, Plane, and Column (SPC) which indicate their function in relation to the scan system. The following CHART 1 shows how the character counter 130 is implemented to display a scanpage of the third computer. The first column shows the SPC sequence. The second column is the SPC broken into binary format, the third column shows which chip, corresponding to the chip select field, is being scanned out, the fourth field gives the character and latches corresponding to that particular character location. The fifth field gives the field type: A "1" in the column P means this is a parity field, H corresponds to a hex field, B a blank, S a special, and 0 means that the chip select will be changed from XC2 to XC3. this was necessary because there is one field that is split between two chips.

CHART 1

| SPC | 012345 | Chip | State | PHBSO |
|---|---|---|---|---|
| 032 | 001110 | XC1 | CODE VIOLATION | 00010 |
| 030 | 001100 | XC1 | SETH | 00010 |
| 031 | 001101 | XC1 | X'00' | 00010 |
| 033 | 001111 | XC1 | SETL | 00010 |
| 022 | 001010 | XC1 | X'00' | 00010 |
| 020 | 001000 | XC1 | WRITE | 00010 |
| 021 | 001001 | XC1 | MODE | 01000 |
| 023 | 001011 | XC1 | BLANK | 00100 |
| 002 | 000010 | XC1 | ACC | 01000 |
| 000 | 000000 | XC1 | PARM | 01000 |
| 001 | 000001 | XC1 | RAM DATA ERR | 01000 |
| 003 | 000011 | XC1 | BLANK | 00100 |
| 012 | 000110 | XC1 | STAT0–3 | 01000 |
| 010 | 000100 | XC1 | STAT4–7 | 01000 |
| 011 | 000101 | XC1 | STAT8 | 01000 |
| 013 | 000111 | XC1 | STAT PAR | 10000 |
| 132 | 011110 | XC2 | BLANK | 00100 |
| 130 | 011100 | XC2 | RMDM H | 01000 |
| 131 | 011101 | XC2 | RMDM L | 01000 |
| 133 | 011111 | XC2 | BLANK | 00100 |
| 122 | 011010 | XC2 | RAMA HIGH | 01000 |
| 120 | 011000 | XC2 | RAMA LOW | 01000 |
| 121 | 011001 | XC2 | RAMA PAR | 10000 |
| 123 | 011011 | XC2 | BLANK | 00100 |
| 102 | 010010 | XC2 | ROMA 0,1 | 01000 |
| 100 | 010000 | XC2 | ROMA 2–5 | 01000 |
| 101 | 010001 | XC2 | ROMA 6,7 8,9 H | 01001 |
| 103 | 010011 | XC2 | ROMA 10–13 | 01001 |
| 112 | 010110 | XC2 | ROMA 16,17 14,15 H | 01001 |
| 110 | 010100 | XC2 | ROMA PAR | 10000 |
| 111 | 010101 | XC2 | ROMA PAR | 10001 |
| 113 | 010111 | XC2 | BLANK | 00100 |
| 332 | 111110 | XC3 | BLANK | 00100 |
| 330 | 111100 | XC3 | XTCU | 01000 |
| 331 | 111101 | XC3 | UPDT | 01000 |
| 333 | 111111 | XC3 | BLANK | 00100 |
| 322 | 111010 | XC3 | KEY HIGH | 01000 |
| 320 | 111000 | XC3 | KEY LOW | 01000 |
| 321 | 111001 | XC3 | KEY PAR | 10000 |
| 323 | 111011 | XC3 | KEY VALD FERR | 01000 |
| 302 | 110010 | XC3 | BLANK | 00100 |
| 300 | 110000 | XC3 | FE IMPL KEYS | 01000 |
| 301 | 110001 | XC3 | BLANK (ROMA 8,9 | 00100 |
| 303 | 110011 | XC3 | BLANK (ROMA 10- | 00100 |
| 312 | 110110 | XC3 | BLANK (ROMA 14, | 00100 |
| 310 | 110100 | XC3 | BLANK | 00100 |
| 311 | 110101 | XC3 | BLANK (ROMA PAR | 00100 |

CHART 1 -continued

| SPC | 012345 | Chip | State | PHBSO |
|-----|--------|------|-------|-------|
| 313 | 110111 | XC3 | BLANK | 00100 |
| 232 | 101110 | XC4 | BLANK | 00100 |
| 230 | 101100 | XC4 | SETC | 01000 |
| 231 | 101101 | XC4 | BLANK | 00100 |
| 233 | 101111 | XC4 | INDX 0-2 | 01000 |
| 222 | 101010 | XC4 | INDX 3-6 | 01000 |
| 220 | 101000 | XC4 | INDX PAR | 10000 |
| 221 | 101001 | XC4 | SCSR 0-3 | 01000 |
| 223 | 101011 | XC4 | SCSR 4-7 | 01000 |
| 202 | 100010 | XC4 | SCSR 8-11 | 01000 |
| 200 | 100000 | XC4 | SCSR PAR | 10000 |
| 201 | 100001 | XC4 | BLANK | 00100 |
| 203 | 100011 | XC4 | ERRORS | 01000 |
| 212 | 100110 | XC4 | BLANK | 00100 |
| 210 | 100100 | XC4 | BLANK | 00100 |
| 211 | 100101 | XC4 | LINE25 END | 00100 |
| 213 | 100111 | XC4 | LINE25 IDLE | 00100 |

The idle state is SPC=213. When the fourth computer is started it goes to state CODE VIOLATION (SPC=032). This is also its reset state so that resetting the fourth computer 129 will cause it to generate a 25th line. The CODE VIOLATION state is used to cause an error in the terminal if there is another transmission currently going on in the terminal. This causes the terminal to wait for the next valid starting sequence which will be the 25th line display so that the 25 th line will be displayed properly. The next four states send a buffer address of x'0000' to the terminal corresponding to the beginning of the 25th line. The next state sends a write command which tells the terminal to put the following data in the buffer. These six states are special because each state sends a different data pattern to the terminal. During these states the bit counter decode logic uses the character counter's plane and column addresses along with its own plane, column, and row addresses to send a hardwired bitstream to the terminal corresponding to the previously mentioned commands and data. All the remaining states send either a hex field, parity field, or blank to the terminal as determined by the character counter decode logic.

The character counter is incremented during the last bit transmitted of a character (bit 12). During this bit the character counter will send a signal to the bit counter telling whether there is another character to come or whether the next state is the idle state in which case the bit counter will send an ending sequence to the terminal and wait for the auto-response (TT/AR). The TT/AR is ignored by the fourth computer 129 since this only provides a transmission error indication. Having to deal with this only adds complexity to the fourth computer 129 which is counter to the basic idea of the fourth computer 129. The only thing we could do with an error would be to transmit another 25th line, but since the 25th is usually being transmitted regularly anyway, it is not really necessary.

Bit Counter. The bit counter 131 in FIG. 7 is a six bit counter based on the scan sequence also. Its three half-nibbles are called plane, column, and row (PCR). The plane and column are not confused with the character counters plane and column since they are used only internally by the bit counter logic. The row is the actual row that is sent out as part of the parallel scan address. The sequencing of the bit counter 130 is shown in the following CHART 2:

CHART 2

| PCR | 012345 | 3278 bit | New State (if any) |
|-----|--------|----------|--------------------|
| 322 | 000101 | Idle | |
| 320 | 000111 | Quiesce 1 | |
| 321 | 000110 | Quiesce 2 | |
| 323 | 000100 | Quiesce 3 | |
| 302 | 001101 | Quiesce 4 | |
| 300 | 001111 | Quiesce 5 | |
| 301 | 001110 | Code Violation 1 | |
| 303 | 001100 | Code Violation 2 | |
| 312 | 001001 | Code Violation 3 | |
| 310 | 001011 | Start bit | |
| 311 | 001010 | Data bit 2 | |
| 313 | 001000 | Data bit 3 | |
| 332 | 000001 | Data bit 4 | |
| 330 | 000011 | Data bit 5 | |
| 331 | 000010 | Data bit 6 | |
| 333 | 000000 | Data bit 7 | |
| 222 | 010101 | Data bit 8 | |
| 220 | 010111 | Data bit 9 | |
| 221 | 010110 | Data bit 10 | |
| 223 | 010100 | Data bit 11 | |
| 202 | 011101 | Data bit 12 | 310 if not LINE25 END else do ending sequence |
| 200 | 011111 | End bit | |
| 201 | 011110 | Mini Code Viol. 1 | |
| 203 | 011100 | Mini Code Viol. 2 | |
| 212 | 011001 | Receive Quiesce bits | receive states receive states receive states |
| 010 | 111011 | Receive minicode viol. 322 | receive states |

The idle state (and reset state) of the bit counter is PCR=322 (note that the binary representation of the PCT is inverted to be consistent with the scanner 56 of FIG. 3). The character counter 129 sends a signal to the bit counter 130(=LINE 25 IDLE) which starts the bit counter 130. This operation causes the bit counter to start sequencing through its states. The first eight states send out the 3278 display 121 starting sequence which consists of five zeroes (quiesce bits) followed by a three bit code violation which signals the start of valid data. The first data bit is called the start bit and is always a one. The next eight bits (bits 2-9) are the actual data or command and bit 10 is normally parity over the data bits. Bit 11 is the command bit which indicates whether bits 2-9 were data or a command and during this state the bit counter enables the character counter to be incremented. Bit 12 is another parity bit. During bit 12 (PCR=202) the bit counter 130 looks at the incremented character counters signal to see if another character is to be sent. If so then the bit counter gets to the LINE25 END state no more characters need be sent so the bit counter, when it gets to bit 12, goes to the ending sequence starting with the end bit (a zero, PCR=200) and a mini-code violation which consists of setting the output high. This indicates to the terminal that transmission has ended and to send an auto-response. The bit counter then waits for this response to come back although it does nothing with it.

Format Decoding Logic. The character decode 132 and the bit decode 133 of FIG. 7 provide the proper format for the data sent to the display 121. There are three different data formats that are sent to the display 121 in terminal 12: hardwired (blanks and special), hex fields, and parity fields. This section describes the format for these characters and where the scan data fits into these characters under control of the decoders 132 and 133. These formats describe bits 1-12 of the data word. Bit 1 is the start bit and is always a one. Bits 10 and 12 are parity bits which are filled in automatically by the bit counter logic from a parity accumulator. Bits 2–9 and 11 which are the data bits and command bit are the only ones which change based on the character counter's selection.

CHART 3
Special characters and blanks

SPECIAL SET CURSOR HIGH COMMAND
| 1 | 2 | 3 | 4 | 5 | 6 | 7 | 8 | 9 | 10 | 11 | 12 |
|---|---|---|---|---|---|---|---|---|----|----|----|
| 1 | 0 | 0 | 0 | 0 | 0 | 0 | 1 | 0 | 0  | 1  | 1  |

SPECIAL DATA x'00'
| 1 | 2 | 3 | 4 | 5 | 6 | 7 | 8 | 9 | 10 | 11 | 12 |
|---|---|---|---|---|---|---|---|---|----|----|----|
| 1 | 0 | 0 | 0 | 0 | 0 | 0 | 0 | 0 | 1  | 0  | 0  |

SPECIAL SET CURSOR LOW COMMAND
| 1 | 2 | 3 | 4 | 5 | 6 | 7 | 8 | 9 | 10 | 11 | 12 |
|---|---|---|---|---|---|---|---|---|----|----|----|
| 1 | 0 | 0 | 0 | 1 | 0 | 0 | 1 | 0 | 0  | 1  | 0  |

SPECIAL WRITE DATA COMMAND
| 1 | 2 | 3 | 4 | 5 | 6 | 7 | 8 | 9 | 10 | 11 | 12 |
|---|---|---|---|---|---|---|---|---|----|----|----|
| 1 | 0 | 0 | 0 | 0 | 1 | 1 | 0 | 0 | 0  | 1  | 0  |

BLANK BLANK
| 1 | 2 | 3 | 4 | 5 | 6 | 7 | 8 | 9 | 10 | 11 | 12 |
|---|---|---|---|---|---|---|---|---|----|----|----|
| 1 | 0 | 0 | 0 | 1 | 0 | 0 | 0 | 0 | 0  | 0  | 0  |

These words are generated by decoding the appropriate SPC, PCR combination wherever a one is needed.

Hex fields

The 3278 character codes for hex characters are: '0–9' is x'20'–x'29', 'A–F' is x'A0'–x'A5'. There are five bits that change depending on the hex data: bits 2, 6, 7, 8, and 9. The logic equations to convert the scan data to 3278 data bits for the display 121 are shown in CHART 4 as follows:

CHART 4

Dx = data bit x that is scanned out. 0 is highest order.
bit2 = D0 D1 @ D9 D2
bit6 = D0 D1 D2
bit7 = D0 D1 @ D0 D2
bit8 = D0 D2 @ D0 D2
bit9 = D3

Notice that in order to generate bit2 we need data bits 0, 1, and 2. This means we have to latch these bits up temporarily in an accumulator. Data bit 0 is latched up during bit 12 of the previous character (This is valid since the character counter was incremented at the beginning of this bit). Data bit 1 is latched up during the start bit of the current character and data bit 2 is used directly to generate bit 2 of the character. Knowing this means that we must assign the scan address of data bit 0 to row 2 since bit 12 has a PCR=202, data bit 1 on row 0, data bit 2 on row 1, and data bit 3 on row 3. As an example, using the above descriptions of the two state machines, the scan address of the high order latches of the RAMA must be as follows: bit0=222, bit1=220, bit2=221, and bit3=223.

CHART 5

| HEX | | HEX DATA | | | | | | | | | |
|---|---|---|---|---|---|---|---|---|---|---|---|
| 1 | 2 | 3 | 4 | 5 | 6 | 7 | 8 | 9 | 10 | 11 | 12 |
| 1 | bit2 | 0 | 1 | 0 | bit6 | bit7 | bit8 | bit9 | p0 | 0 | p1 |

Parity Fields

The four parity characters have the following 3278 character codes: '*' no bar=x'BF', '*' bar=x'9F', ';' no bar=x'BE', and ';' bar=x'9E'. This means that only 3278 bits 4 and 9 change based on the parity value and the value of the parity latch. When we generate a parity field we invert the sense of the parity latch. This is because its phase is usually inverted so that it will reset to odd parity. The data bits are defined as in CHART 6 as follows:

CHART 6 bit4 = parity latch
bit9 = parity value

Since bit 4 has PCR=332 the parity latch must be assigned on scan row 2. Bit9 has PCR=220 so must be assigned on scan row 0. These data bits do not need to be latched in the fourth computer 129 since they are only used in one bit position each.

CHART 7

| PAR | | | PAR DATA | | | | | | | | |
|---|---|---|---|---|---|---|---|---|---|---|---|
| 1 | 2 | 3 | 4 | 5 | 6 | 7 | 8 | 9 | 10 | 11 | 12 |
| 1 | 1 | 0 | bit4 | 1 | 1 | 1 | 1 | bit9 | p0 | 0 | p1 |

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data processing system comprising, a general-purpose, programmable first computer constructed from a plurality of first circuits, said first circuits having direct connections for accessing said first circuits in connection with the execution of a first program of instructions, said first circuits having first redundant connections for use in accessing said first circuits independently of said first program of instructions, said first computer including first scanner means for accessing said first redundant connections, a programmable second computer constructed from a plurality of second circuits, said second circuits having direct connections for use in the execution of a second program of instructions using selected ones of said second circuits, said second circuits having second redundant connections for accessing said second circuits independently of said second program of instructions, said second computer including second scanner means for accessing said second redundant connections, said second computer connected to said first scanner means whereby said second program controls the accessing of said first circuits through said first redundant connection and independently of said first program of instructions, a programmable third computer constructed from a plurality of third circuits, said third computer executing a third program of instruction, said third computer connected to said second scanner means whereby said third computer controls the accessing of said second circuits through said second redundant connections under control of said third program and independently of said second program, said third computer including means for continuously monitoring said second computer to determine if said second computer requires control by said third computer, a display means for displaying scan data, and a fourth computer coupled to said display means for controlling the display of scan data from said third computer.

2. The apparatus of claim 1 wherein said second computer includes a restart latch settable by said first computer when said first computer is requesting the restarting of said second computer, wherein said third computer periodically interrogates said restart latch under control of said third program for controlling the restarting of said second computer.

3. The apparatus of claim 1 wherein said second computer includes means for detecting occurrence of errors in the execution of instructions and an error latch settable by said second computer when said second computer detects an error and wherein said third computer periodically interrogates said error latch under control of said third program.

4. The apparatus of claim 1 wherein said second computer includes means for monitoring power to said second computer and a power-on latch settable by said second computer when said second computer experiences that the power to said second computer has been off and has come on and wherein said third computer periodically interrogates said power-on latch under control of said third program.

5. The apparatus of claim 1 wherein said second computer includes a stopped latch settable by said second computer when said second computer has stopped processing said second program of instructions and wherein said third computer periodically interrogates said stopped latch under control of said third program.

6. The apparatus of claim 1 wherein said third computer includes a retried latch settable by said third computer when said third computer has tried restarting said second computer a predetermined number of times and wherein said third computer periodically interrogates said retried latch under control of said third program.

7. The apparatus of claim 1 wherein said system includes a terminal having a display and a keyboard, includes a multiplexer for connecting said terminal between said second computer and said third computer, includes a terminal latch settable by said third computer for controlling said multiplexer to allocate said terminal to said second or to said third computer, and wherein said third computer sets said terminal latch under control of said third program to allocate said terminal to said third computer when said third computer is operating to restart said second computer.

8. The apparatus of claim 1 wherein said third computer includes a first memory for storing instructions and includes a second memory for storing scan-out data in locations corresponding to locations scanned-out from said second computer.

9. The apparatus of claim 8 wherein said first scanner means includes a scanout address data register connected to receive a scanout address in response to said second program and includes scan gates connected to receive information from said first scanner means under control of said second program.

10. The data processing system of claim 9 wherein said first computer further including, a plurality of chip carriers each containing an associated plurality of chips and each connected to receive said address bus and connected to provide an input to said scanout means, means associated with each chip carrier for addressing one of the associated chips in response to information on each address bus, means on each of said chips responsive to said address bus for addressing a specified one of said selected first circuits on said chip and for connecting said redundant connections of each addressed first circuit to said scanout means.

11. The system of claim 1 wherein said third computer includes means for grey coding microstore addresses.

12. The system of claim 1 wherein said third computer includes means for altering and displaying hex and parity fields specified by HEX and PAR instructions.

13. The system of claim 1 wherein said third computer includes means for performing parity operations involving display fields which are transparent to the code.

14. The system of claim 1 wherein said third computer includes means for tracking and moving a cursor.

15. The system of claim 1 wherein said third computer includes means to verify that data scanned into the second computer is the same as is in the third computer.

16. The system of claim 1 wherein said third computer includes means for storing a key value in a key register and means to set the terminal state in response to said key value.

17. The system of claim 1 wherein said third computer includes means for addressing individual latches using chip and latch subcommands.

18. The system of claim 1 wherein said fourth computer includes, means for receiving scan data from said third computer, first multiplexer means for selecting bits of said scan data, character counter means for controlling said first multiplexer means, accumulator means for receiving selected bits from said first multiplexer means, second multiplexer means for selecting bits of accumulated data from said accumulator means for display, bit counter means for controlling said second multiplexer means.

19. The system of claim 18 wherein said bit counter means includes decoder means for decoding counts from said bit counter means and said character counter means to select said accumulated data.

20. A host computer coupled to a terminal, said host computer formed by circuits providing data paths of the computer where the circuits are formed on chips, the scan apparatus on each chip comprising, sequencer means for performing scan sequences, control logic to control the scan sequence performed by said sequencer means, data line means selectively connected between said terminal and data paths in said host computer independently from the operation of said host computer, decoder means controlled by said sequencer means to control the selective connection of the data line means to access said locations.

21. The scan apparatus of claim 20, wherein said sequencer means includes a counter and includes control logic for controlling the counting of said counter, said counter providing outputs to said decoder means, whereby the decoder controls the selective connection of the data line means.

22. The scan apparatus of claim 21, where the circuits providing data paths are latch circuits and where the latch circuits are organized in a plane including rows and columns of said latch circuits, said decoder means having a row decoder for decoding each of the rows in the array and including a column decoder for decoding each of the columns in the array.

23. The scan apparatus of claim 22 wherein each of said circuits comprises, a sample and hold latch circuit, having direct connection lines including data-in and data-out lines, including a clock sample input line, and including a clock hold input line, row and column input lines for accessing said latch circuit independently from the direct connection lines, a scan-out gate enabled by said row and column input lines, providing a scan-out of said latch circuit independently from the direct connection lines.

24. The scan apparatus of claim 23, wherein said latch circuit further includes a scan-in line for scanning in data to said latch circuit under control of said row and column input lines.

25. The scan apparatus of claim 24 wherein said latch circuit further includes a reset input.

* * * * *